A. E. STANDEN.
MEASURING SYSTEM AND MEANS THEREFOR.
APPLICATION FILED SEPT. 8, 1903.
946,471.
Patented Jan. 11, 1910.
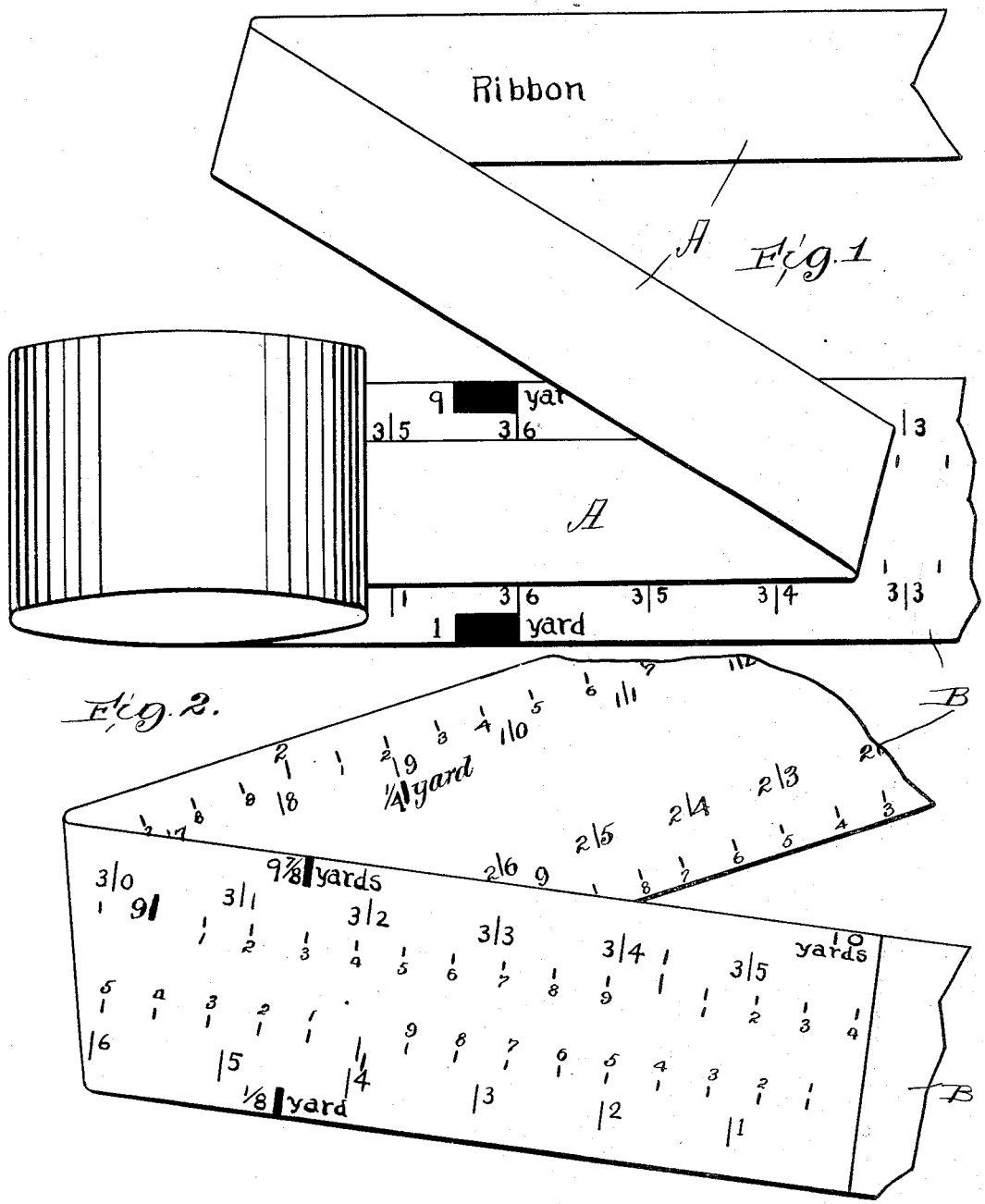

UNITED STATES PATENT OFFICE.

ALFRED E. STANDEN, OF CHICAGO, ILLINOIS.

MEASURING SYSTEM AND MEANS THEREFOR.

946,471.   Specification of Letters Patent.   Patented Jan. 11, 1910.

Application filed September 8, 1903. Serial No. 172,295.

*To all whom it may concern:*

Be it known that I, ALFRED E. STANDEN, a citizen of the United States, and a resident of Chicago, Cook county, Illinois, have invented certain new and useful Improvements in Measuring Systems and Means Therefor; and I do hereby declare that the following is a full, clear, and exact description of the same, reference being had to the accompanying drawings, and to the letters of reference marked thereon, which form a part of this specification.

This invention relates more particularly to a measuring system and means therefor adapted to permit any desired quantity or portion or length of fabric or other material capable of being put up in coils, bolts, rolls or the like to be measured therefrom and at the same time to indicate accurately the quantity or amount of the material remaining in the piece.

Heretofore it has been customary to put up fabric of all kinds and many other materials in rolls bolts or coils containing a given number of yards dependent upon the character or class of goods. In selling the goods at retail it has been customary to measure from the outer end of the roll bolt or coil, the desired quantity of the fabric by means of an ordinary yard tape or the customary counter measure with the result that after the goods have once been cut it is usually impossible for the salesman to know accurately the quantity of goods remaining in the piece without unrolling, measuring the same and again rolling. As a consequence the goods are greatly injured and soiled by the frequent rolling and unrolling by salesmen to determine if the roll or bolt contains enough to fill a given order. Furthermore at the time of stocktaking it is necessary to actually unroll and measure all the goods or fabric remaining in stock but obviously though the quantity of the goods is usually marked in pencil on the covering wrapper or tag it again becomes meaningless after the first sale from the roll.

The object of this invention is to provide means enabling the salesman to measure much more quickly the desired quantity of the fabric from the roll, bolt or coil and at the same time, or at any time subsequent, to determine without unrolling the goods, the exact amount of the fabric remaining thus greatly economizing in expense for labor and saving the fabric from injury due to unnecessary handling.

The invention consists in the matters hereinafter described and more fully pointed out and defined in the appended claims.

In the drawings: Figure 1 is a view partly in perspective of a ribbon roll provided with a measuring device embodying my invention. Fig. 2 is a view of a measuring strip embodying my invention showing both front and rear sides thereof.

As shown in said drawings: A indicates the material or fabric which in the present instance for convenience of illustration is indicated as a ribbon and B indicates a measuring strip which may be of any desired width or material, but in the drawings is shown of a width slightly greater than the fabric and is provided along one or both margins with standard linear scales reading opposite from the ends and from end to end of the fabric and said strip. Preferably said scales are expressed both in the metric system and in yards, fractions thereof and inches, and where the strip is of sufficient width as shown in the drawings said scales are arranged on both sides of the strip. On one side in that case the English scale expressed in yards, fractions thereof and inches is arranged near the margin and reading from opposite ends of the strip and the linear metric scale likewise indicated thereon and also reading from opposite ends and indicated between the outer scales. On the opposite side of the strip the arrangement is preferably reversed, the metric scale being arranged adjacent to the margins and the English scale arranged between the same. This is particularly advantageous and adapts one style of strip to be used with equal advantage in all countries using either the English or metric systems of measurements. In the countries using the English system the ribbon is rolled on the side of the strip on which the English scales are adjacent the margins and for the countries using the metric system the ribbon is wrapped on the opposite side of the strip or on the side with the metric scales adjacent the margins. It is thus seen that in either event the scales of the system used are exposed.

The measuring strips which may be conveniently made of thin paper are of course of a length appropriate to the length of the fabric or other material to be measured thereby as put up by the manufacturer in rolls, bolts, coils or the like.

The operation is as follows:—When the fabric or other material is put up in rolls, bolts or coils ready for market or shipment, a measuring strip such as described and of the proper length is selected and placed or laid on the material with the ends matching and the bolt, roll or coil is formed as usual rolling the strip therein which, if the fabric is narrow, a ribbon or the like, affords protection for the fabric as well as means for facilitating measurement. If the fabric is of wider material such as cotton cloth, silks, woolens or other fabrics, the strip may still be made of a width sufficient to form a protection to the fabric, or if preferred may be made narrow and rolled therein as before described and if of thin paper or other material will not distort or affect the shape of the roll. In selling goods with which my invention is used the salesman cuts therefrom the amount of the sale by reference to the scales inclosed with material. At any time desired the quantity of fabric remaining in the roll or bolt can be instantly determined by inspection and by reference to either linear scale indicated on the strip. Furthermore as both the principal linear scales are used the system is equally advantageous if used with fabrics or materials that are shipped abroad or used in domestic trade. Inasmuch as the measuring strip affords an accurate scale a portion of which the purchaser receives with his order and which indicates the exact amount of his purchase vexatious and unnecessary complaints for supposed short measurements are avoided. Obviously the scales may be otherwise arranged than as herein described and if preferred other scales may be employed in addition thereto and fabrics of any desired kind, capable of being rolled, coiled or put up in bolts may be employed in connection therewith and if preferred the scales may be indicated on the material itself and details of construction and arrangement may be varied without departing from the principles of this invention.

I claim as my invention:—

1. In a device of the class described a thin strip of paper wider than the fabric to be wound thereon having a plurality of oppositely graduated standard scales on each side of the same, the scale of one standard on one side being adjacent the margins and the other scale adjacent the center of the strip and said scales reversely arranged with respect to the middle and margin of the strip on the opposite side of said strip.

2. In a device of the class described a thin strip of paper of greater width than the article rolled therewith having a plurality of oppositely arranged standard scales on each side of said strip, said scales graduated to represent their respective divisions and one placed adjacent the margins and the other adjacent the center and the scales on the opposite side of said strip reversed in position with respect to the margin and middle of the strip.

In testimony whereof I have hereunto subscribed my name in the presence of two subscribing witnesses.

ALFRED E. STANDEN.

Witnesses:
C. W. HILLS,
WILLIAM R. GRANT.